United States Patent
Vollenwyder et al.

(10) Patent No.: US 8,473,129 B2
(45) Date of Patent: Jun. 25, 2013

(54) TRACK BRAKE CONTROLLER

(75) Inventors: Kurt Vollenwyder, Kingston (CA);
Sidney Maxime Berry, Kingston (CA);
Albert D'Amours, Valcourt (CA)

(73) Assignee: Bombardier Transportation GmbH, Berlin (DE)

( * ) Notice: Subject to any disclaimer, the term of this patent is extended or adjusted under 35 U.S.C. 154(b) by 739 days.

(21) Appl. No.: 12/594,054

(22) PCT Filed: Mar. 12, 2008

(86) PCT No.: PCT/CA2008/000480
§ 371 (c)(1),
(2), (4) Date: Apr. 7, 2010

(87) PCT Pub. No.: WO2008/119154
PCT Pub. Date: Oct. 9, 2008

(65) Prior Publication Data
US 2010/0198434 A1 Aug. 5, 2010

Related U.S. Application Data

(60) Provisional application No. 60/921,591, filed on Apr. 3, 2007.

(51) Int. Cl.
| B61K 7/12 | (2006.01) |
| B61L 3/00 | (2006.01) |
| B60T 8/72 | (2006.01) |
| G05D 1/00 | (2006.01) |
| G05D 3/00 | (2006.01) |
| G06F 7/00 | (2006.01) |
| G06F 17/00 | (2006.01) |

(52) U.S. Cl.
USPC .. 701/20; 188/181 A; 188/181 C; 246/182 A; 246/182 C (58) Field of Classification Search
USPC .. 104/26.2; 188/180–189, 193, 197; 246/182, 246/182 A, 182 B, 182 C; 295/22.6; 701/19, 701/20
See application file for complete search history.

(56) References Cited

U.S. PATENT DOCUMENTS

| 2,084,171 | A | * | 6/1937 | Volkers | 188/160 |
| 3,260,843 | A | | 7/1966 | Campbell et al. | |
| 4,341,290 | A | | 7/1982 | Baermann | |
| 4,835,693 | A | | 5/1989 | Smith et al. | |
| 4,836,616 | A | * | 6/1989 | Roper et al. | 303/122.06 |
| 4,904,027 | A | * | 2/1990 | Skantar et al. | 303/15 |
| 5,471,387 | A | * | 11/1995 | Wood et al. | 701/71 |

(Continued)

FOREIGN PATENT DOCUMENTS

| CA | 933995 A | 9/1973 |
| CA | 2013646 A1 | 10/1990 |
| EP | 0392938 A1 | 10/1990 |

*Primary Examiner* — Khoi Tran
*Assistant Examiner* — Abby Lin
(74) *Attorney, Agent, or Firm* — The Webb Law Firm (57) ABSTRACT

A track brake control system for providing braking of a railway vehicle operates upon receipt of an emergency braking command. The control system includes a member for receiving deceleration information from one or more sensing devices. The control system further includes a member for comparing the deceleration information with a reference value or reference profile. Further, the control system includes at least one regulating device for continuously adjusting a braking demand signal to a track brake so as to cause deceleration of the railway vehicle based on the comparison.

14 Claims, 4 Drawing Sheets

Method of controlling a track brake

U.S. PATENT DOCUMENTS

| | | | |
|---|---|---|---|
| 6,302,241 B1 * | 10/2001 | Gronowicz, Jr. | 188/1.11 L |
| 7,176,645 B2 * | 2/2007 | Shimada et al. | 318/432 |
| 2005/0263356 A1 | 12/2005 | Marzano et al. | |
| 2006/0060437 A1 * | 3/2006 | Renner et al. | 188/266.3 |
| 2006/0136105 A1 * | 6/2006 | Larson | 701/30 |
| 2008/0023593 A1 * | 1/2008 | Ritota et al. | 246/187 A |

* cited by examiner

FIG. 1 One embodiment of a track brake control system

FIG. 2 A second embodiment of a track brake control system

FIG. 3 One embodiment of a track brake control system

FIG. 4 Method of controlling a track brake

TRACK BRAKE CONTROLLER

FIELD OF THE INVENTION

The present invention is directed generally to a braking system for a vehicle and, more particularly, to controlling a track brake of a rail vehicle.

BACKGROUND OF THE INVENTION

During emergency braking of a rail vehicle, a control system of the said vehicle applies spring actuated disc brakes and electromagnetic and/or permanent magnet track brakes (collectively referred to hereinafter as "the emergency brakes") to achieve braking. The track brakes are designed to function in an on/off manner. The present control of these track brakes is realized by contactors to switch the track brakes on. At present, the brake force of the emergency brakes programmed into the control system is designed for the maximum vehicle weight. Consequently, the application of the emergency brakes on a vehicle which has less than maximum load, combined with the low rotational inertia of the wheels, leads to wheel slide and wheel flats. Presently existing systems apply the emergency brakes in coarse steps based on pre-calculated load conditions. Furthermore, the track brake friction increases at lower speeds, resulting in an abrupt stop causing an uncomfortable ride for the passengers.

In order to overcome the disadvantages of wheel slide, wheel flats, and abrupt stops; a two-level emergency brake (EB) system was introduced. The system uses a brake assurance monitor (BAM) to intercept the emergency brake command and control the emergency brakes as needed. In an EB level I braking situation, the BAM controls braking through the use of a linear induction motor (LIM) and track brakes in closed loop deceleration control without applying disc brakes, hence avoiding wheel flats and abrupt stops of the vehicle. In an EB Level II braking situation, the BAM monitors the achieved deceleration profile (from the EB Level I braking) and switches control to the emergency brakes if the required profile is not achieved, resulting in a full application of the disc and track brakes.

U.S. Pat. No. 4,835,693 (hereinafter Smith et al.) discloses a BAM for controlling the braking and propulsion systems of a vehicle comprising a controller for controlling three modes of vehicle braking, namely, normal braking, a first level emergency braking, and a second level emergency braking. The BAM provides emergency braking at two levels. In the first level emergency braking, the braking can be by means of track brakes and the propulsion system, (i.e., LIM) thus avoiding wheel flats and sudden stopping. When the first level emergency braking is not in accordance with a predetermined stopping profile, the controller switches the system to the second level emergency braking which relies on the wheel brakes and the track brakes.

While the BAM functions well, it adds equipment, and considerable additional car wiring. This, further, increases the cost of the system while adding to the complexity of the system. In view of the aforementioned disadvantages and problems with existing braking systems and brake monitors, it would be advantageous to have a braking system and method that provides for an improved and efficient control while providing a smoother ride for the passengers.

SUMMARY OF THE INVENTION

In accordance with one aspect of the present technique, a track brake control system for providing braking of a railway vehicle is disclosed. The embodied control system operates upon receipt of an emergency braking command. In this implementation, the control system includes a means for receiving deceleration information from one or more sensing devices. The control system further includes means for comparing the deceleration information with a reference value or reference profile. Further, the control system includes at least one regulating device for continuously adjusting a braking demand signal to a track brake so as to cause deceleration of the railway vehicle based on this comparison.

In accordance with another aspect of the present technique, a track brake control system utilizing a train network for providing emergency braking of a railway vehicle is disclosed. The embodied control system operates upon receipt of an emergency braking command. In the present implementation, the control system includes means for receiving the deceleration information from at least one sensing device across the train network. The control system also includes means for comparing the deceleration information with a reference value or reference profile. Further, the control system includes at least one regulating device for continuously adjusting a braking demand signal to a track brake across the train network to cause deceleration of the railway vehicle based on said comparison. At least one of the sensing device, the regulating device and the track brake communicate to the others using the train network.

In accordance with yet another aspect of the present technique, a track brake control system for providing emergency braking of a railway vehicle is disclosed. The embodied control system operates upon receipt of an emergency braking command. The control system includes one or more sensing devices to acquire deceleration information, and means for receiving deceleration information from the one or more sensing device. The control system further includes means for comparing the deceleration information with a reference value or reference profile and at least one regulating device for continuously adjusting a braking demand signal to a track brake across the train network to cause deceleration of the railway vehicle based on said comparison.

In accordance with a further aspect of the present technique, a method of modulating track brake force in a vehicle is disclosed. The embodied method operates upon receipt of an emergency braking command. The method involves receiving deceleration information from one or more sensing devices and comparing the deceleration information with a reference value or a reference profile. The method further involves determining a braking demand signal based on the comparison and continuously modulating brake force on the track brake according to the braking demand signal.

BRIEF DESCRIPTION OF THE DRAWINGS

The invention may be more completely understood in consideration of the following detailed description of various embodiments of the invention in connection with the accompanying drawings, in which.

DETAILED DESCRIPTION OF THE PREFERRED EMBODIMENTS

In the following description, numerous specific details are set forth in order to provide a more thorough understanding of the present invention. However, it will be apparent to one skilled in the art that the present invention may be practiced without these specific details. In other instances, well-known features have not been described in detail in order to avoid obscuring the present invention.

Figure 1:
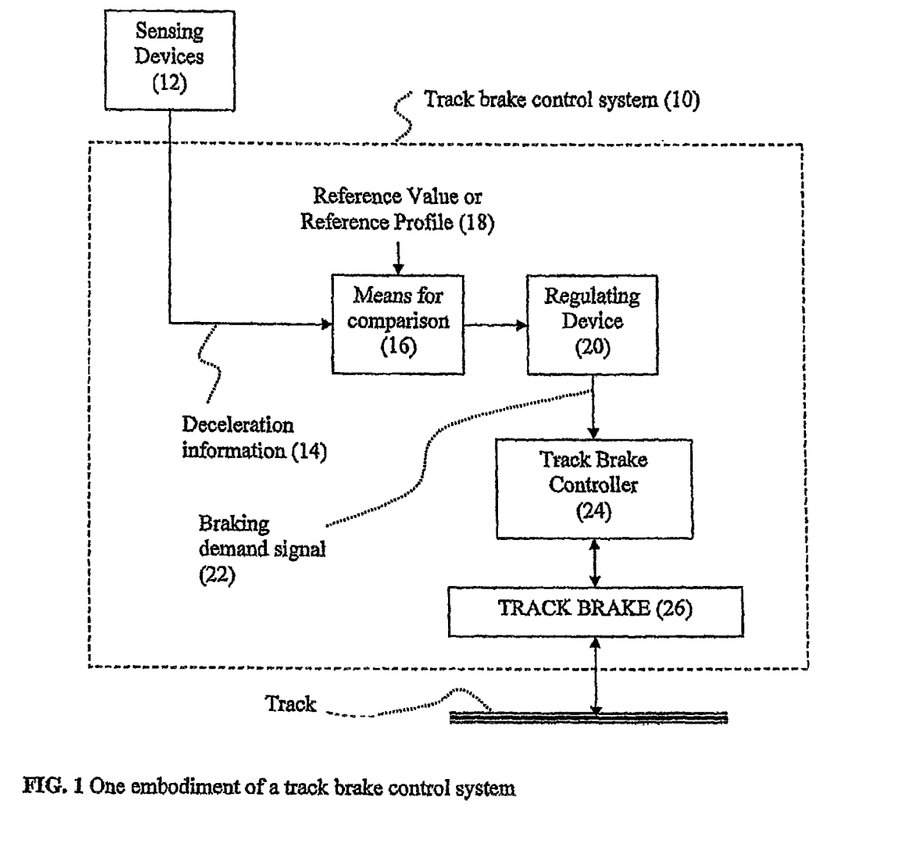
FIG. 1 is a schematic representation of one embodiment of a track brake controller.

Turning now to the drawings and referring first to FIG. 1, an embodiment of a track brake control system (10) is depicted. The embodied control system (10) operates upon receipt of an emergency braking command. In this implementation, the control system (10) includes one or more sensing devices (12) adapted to sense deceleration (and therefore, also acceleration) of the vehicle and obtaining deceleration information (14). The control system further includes means (16) for comparing the deceleration information (14) with a reference value or reference profile (18). Further, the control system (10) includes at least one regulating device (20) for continuously adjusting a braking demand signal (22) to a track brake controller (24) so as to cause deceleration of a railway vehicle on which the track brake (26) is affixed.

The sensing devices (12) may include a plethora of one or more speed measuring devices. Examples of such devices include speedometer, tachometer, or an accelerometer. While these devices have been used to provide an understanding of the technique, it should be apparent to a person skilled in the art that such representations are not to be considered as limiting. Any other speed measurement devices, based on mechanical motion, or pressure measurements may be used in lieu of the aforementioned devices.

Consider an example where a tachometer is used. As known to a person skilled in the art, a tachometer measures distance as a function of several pulses per revolution. Therefore, when a tachometer is used as the sensing device, the deceleration information 14 is in the form of pulses. In a different implementation, when an accelerometer is used, the deceleration information (14) is directly the acceleration or deceleration as the case may be. When the deceleration information (14) is indirectly representing, suitable conversions to bring the value to be an actual deceleration value might be required.

The deceleration information (14) received from the sensing devices (12) are passed on to the means (16) for comparing the deceleration information (14) with a reference value (18). In some instances, the reference value (18) may be in the form of a reference profile containing information about a braking profile. Such comparison may be performed by using either a controller, such as a microprocessor controlled device or any other known forms of controllers, or even using hardware components directly. In some instances, signal filtration may be required to filter out noise from the received information (14). However, it should be noted that using or not using the deceleration information (14) would vary from case to case. In some instances, the control system 10 may directly use the deceleration information (14) even in the presence of a noise signal. In some implementations, the reference profile may be provided as a matrix of preferred reference values for a variety of load conditions of the vehicle. Unlike the implementation illustrated in FIG. 1, in certain other implementations, there may be a different means (not shown) adapted to interface with the sensing devices (12) to receive the deceleration information (14) on to the means (16) for comparing. In a different implementation, a means (not shown) for sending deceleration information may be included to be situated at the end of the sensing devices (12).

The regulating device (20) adjusts the braking demand signal (22) to the track brake (26) based on the comparison operation performed by means (16). Advantageously, the track brake controller (24) may also modulate the track brake force based on the braking demand signal (22). Modulation of the track brake force may be achieved by modulating the track brake voltage or track brake current. Examples of modulation include pulse width modulation technique. In certain embodiments, the regulating device (20) may include the means to modulate the track brake force.

Modulation of track brake force is accomplished in a manner whereupon when it is desired that the track brakes contribute more braking effort, more electrical power is applied to the electromagnetic coils thereof. Conversely, if less braking effort is desired of the track brake, less electrical power is provided to the electromagnetic coils thereof. The electrical power may be provided to the coils of the track brake in any suitable and/or desirable manner. Moreover, each controller (20) and (22) can implement any suitable and/or desirable control algorithm for controlling the application of track brakes. For example, each controller can implement any one or combination of proportional, integral and/or derivative control for controlling the application of track brakes.

The braking demand signal (22) to the track brake controller (24) may be modulated between zero and 100%, but typically between zero and 99%. The braking demand signal may indirectly be thought of as the braking voltage. But because the track brake is basically an electromagnet, it requires high current and hence modulation of track brake current may also be done. This causes the vehicle, on which the track brake (26) is attached to, to decelerate based on the amount of braking demand signal (22) sent from the regulating device (20) to the track brake controller (24). While it may not be apparent to a person of ordinary skill in the art, there is a feedback operation in this braking implementation. When the vehicle slows down, it causes the sensing devices (12) to register a change in their measured parameters, in this particular example—deceleration, which causes the values (14) flowing into means (16) to alter. The reference value (18) may or may not change depending on the braking effort. In one instance, the reference value increases with decrease in speed but it may not always be required to alter in such a fashion. In certain other instances, the reference value may increase with increase in speed, or decrease with decrease in speed. It must be noted however, that the reference value (18) is always a function of speed of the vehicle.

If the braking effort of the vehicle matches that of the profile, then no adjustments to the braking effort is made. However, it should be noted that there is continuous reduction in speed because of the braking and that is always taken into consideration for adjusting the required braking effort. This is caused by closed loop control using an indirect feedback mechanism. Should the braking effort not be in accordance with the braking profile, then suitable adjustments i.e., under correction or over correction of braking effort is made by the track brake controller to bring the braking effort back to the braking profile.

In a further advantageous embodiment, the regulating device (20) may include a micro-controller such as a programmable logic device (PLC) controller. In a further embodiment, the regulating device (20) may include a solid state integrated device that may or may not include a microprocessor. As will be appreciated by a person skilled in the art, the PLC controller may be replaced with any available controller to achieve the similar functionality.

The advantages of a smoother braking of the vehicle are almost no wheel flats, smoother and comfortable ride for the passengers, and optimal usage of vehicle components for a longer life.

Figure 2:
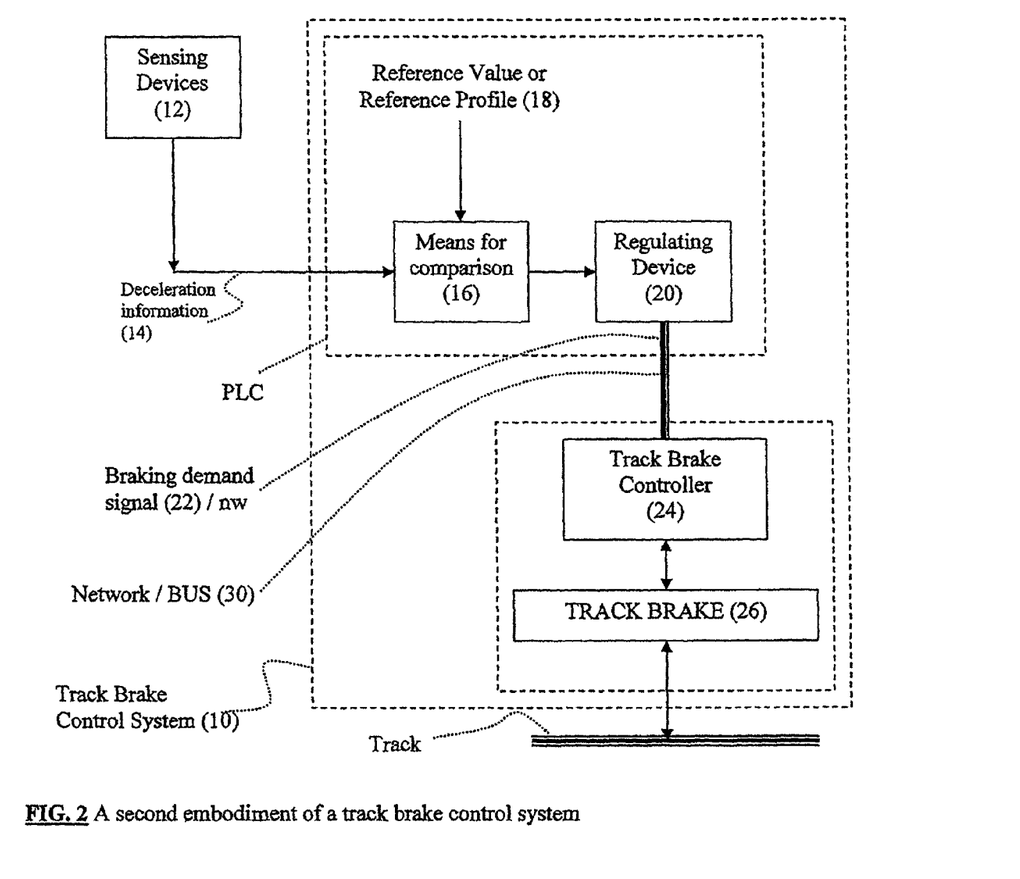
FIG. 2 is a schematic representation of another embodiment of a track brake controller.

FIG. 2 illustrates another embodiment of the track brake control system discussed herein above. In the present implementation, the track brake control system utilizes an existing train network (30), e.g. a CANBUS Network for providing emergency braking of a railway vehicle. Again, the embodied control system operates upon receipt of an emergency braking command. The regulating device (20) communicates with the track brake controller (24) via the network (30). The various components illustrated in FIG. 2 function in a similar manner as disclosed in FIG. 1. The various embodiments of the arrangement shown in FIG. 1 may be used in a similar manner for the arrangement shown in FIG. 2.

Figure 3:
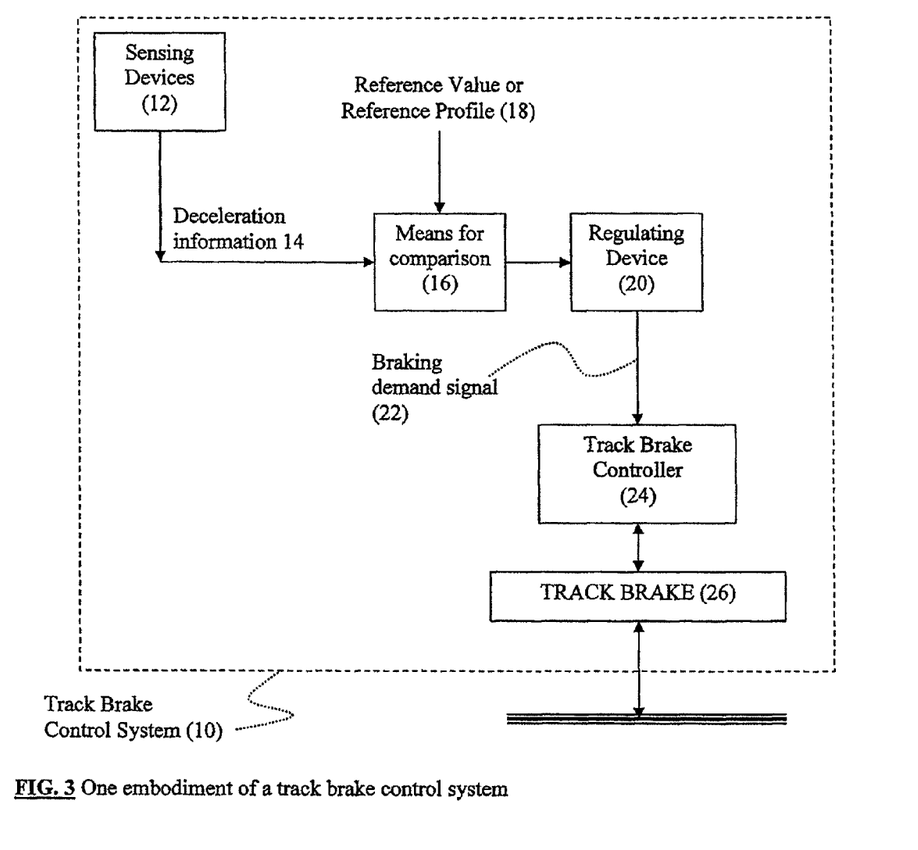
FIG. 3 is a schematic representation of yet another embodiment of a track brake controller.

FIG. 3 illustrates a further embodiment of the track brake controller where the sensing devices, the means, and the regulating device are all located together. The functions of the various components, in terms of what they receive as input and what they provide as an output remain essentially the same. However, additional or reduced configuration of the various components, in terms of how they receive their input and how they provide their output will vary and such modifications will be considered to be within the scope of this application. The various embodiments of the arrangement shown in FIG. 1 may be used in a similar manner for the arrangement shown in FIG. 3.

Figure 4:
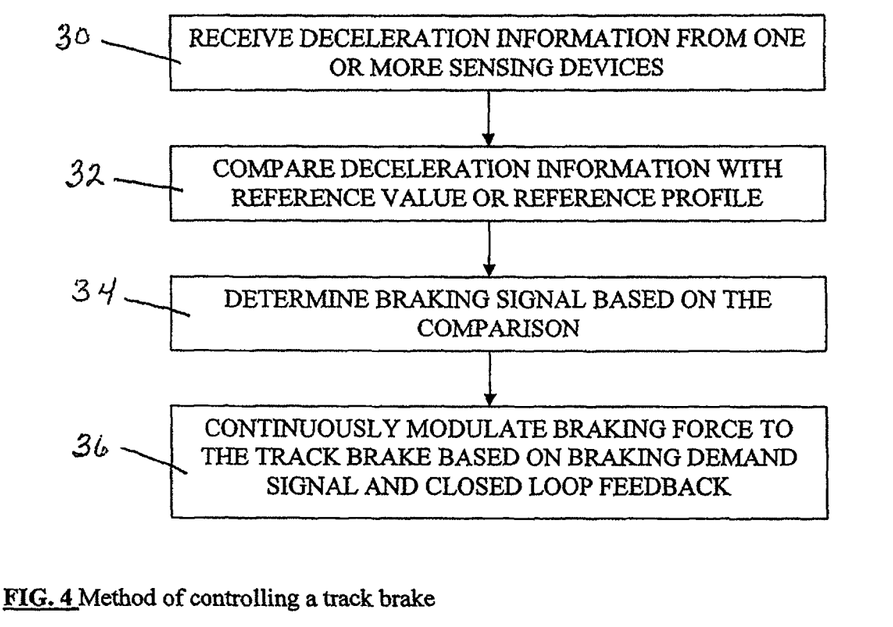
FIG. 4 is a flowchart of an embodiment of a method of controlling a track brake.

FIG. 4 is a flowchart illustrating an exemplary method of controlling a track brake to provide smoother, and controlled braking of the vehicle on which the track brake is affixed. The embodied method operates upon receipt of an emergency braking command. The method involves receiving deceleration information from one or more of the sensing devices (step 30) and comparing the deceleration information with a reference value or a reference profile (step 32). The method further involves determining a braking demand signal based on the comparison (step 34) and continuously modulating brake force on the track brake according to the braking demand signal (step 36). It must again be assumed that these steps may be performed by one or more multiple modules. In certain other implementations, such functionality may even be combined into fewer modules. Such modifications should be construed as falling within the scope of this application.

It must also be noted that certain steps of controlling the track brake may be achieved by means of a micro-processor operating on a sequence of logical operations. Such logical operations may be either hard-programmed into the microprocessor. In certain implementations, the logical operations may also be incorporated into the microprocessor in the form of computer readable instructions, for example, software code. Such code may be introduced into a processing device through any kind of known computer readable media (including all known types of magnetic and optical media).

As described above, the various embodiments or select portions of the embodiments of the invention may be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, where when the computer program code is loaded into and executed by a computer, the computer becomes an apparatus for practicing the invention. When implemented on a general-purpose microprocessor, the computer program code segments configure the microprocessor to create specific logic circuits.

The present invention finds its applications in the field of vehicle track brakes, particularly in the rail industry. However, it is conceivable for this invention to be used in a different non-rail based industry with appropriate modifications.

While the present invention has been described with reference to several particular example embodiments, those skilled in the art will recognize that many changes may be made thereto without departing from the spirit and scope of the present invention, which is set forth in the following claims.

The invention claimed is:

1. A track brake control system for providing emergency braking of a railway vehicle upon receipt of an emergency braking command, the control system comprising:
    means for comparing deceleration information obtained from one or more sensing devices with a reference value or reference profile; and
    at least one regulating device for continuously adjusting a braking demand signal to a track brake controller to cause deceleration of the railway vehicle via friction applied by a track brake based on said comparison, wherein the track brake controller modulates the track brake friction by modulation of a track brake voltage or track brake current and the modulation of the track brake voltage or track brake current is performed by a pulse width modulation signal.

2. The track brake control system of claim 1, further comprising means to modulate track brake friction in accordance with the braking demand signal.

3. The track brake control system of claim 1, wherein said sensing device comprises a speed measurement device comprising at least one of an accelerometer, a tachometer, or a speedometer.

4. The track brake control system of claim 1, wherein the regulating device is based on a programmable logic control device.

5. The track brake control system of claim 1, wherein the regulating device and/or the track brake controller is an integrated solid state device.

6. The track brake control system of claim 5, wherein the integrated solid state device comprises a microprocessor.

7. The track brake control system of claim 1, wherein the one or more sensing devices and/or the regulating device is incorporated in the track brake control system.

8. The track brake control system of claim 1, wherein the pulse width modulation signal is received through a train network comprising the at least one regulating device.

9. A track brake control system utilizing a train network for providing emergency braking of a railway vehicle upon receipt of an emergency braking command, the control system comprising:
    means for comparing deceleration information obtained via a sensing device with a reference value or reference profile; and
    at least one regulating device for continuously adjusting a braking demand signal to a track brake across the train network to cause deceleration of the railway vehicle via friction applied by the track brake based on said comparison,
    wherein at least the regulating device and the means for comparing communicate with each other using the train network, wherein said regulating device modulates the friction of the track brake by modulation of a track brake voltage or track brake current and the modulation of the track brake voltage or track brake current is based on a pulse width modulation signal.

10. The track brake control system of claim 9, further comprising means to modulate the track brake friction in accordance with the braking demand signal.

11. The track brake control system of claim 9, wherein said sensing device comprises a speed measurement device comprising at least one of an accelerometer, a tachometer, or a speedometer.

12. The track brake control system of claim 9, wherein the modulation occurs across the train network.

13. The track brake control system of claim 9, wherein the pulse width modulation signal is received through the train network comprising the at least one regulating device.

14. The track brake control system of claim 9, wherein the regulating device is based on a programmable logic control device or pre-programmed logic control device.

* * * * *

UNITED STATES PATENT AND TRADEMARK OFFICE
CERTIFICATE OF CORRECTION

PATENT NO.       : 8,473,129 B2                                       Page 1 of 1
APPLICATION NO. : 12/594054
DATED            : June 25, 2013
INVENTOR(S)      : Vollenwyder et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 923 days.

Signed and Sealed this
Eighth Day of September, 2015

Michelle K. Lee
*Director of the United States Patent and Trademark Office*